US012094049B2

United States Patent
Bao et al.

(10) Patent No.: US 12,094,049 B2
(45) Date of Patent: Sep. 17, 2024

(54) SHADER AUTO-SIMPLIFYING METHOD AND SYSTEM BASED ON RENDERING INSTRUCTION FLOW

(71) Applicant: ZHEJIANG UNIVERSITY, Hangzhou (CN)

(72) Inventors: Hujun Bao, Hangzhou (CN); Rui Wang, Hangzhou (CN); Dejin He, Hangzhou (CN); Shi Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 331 days.

(21) Appl. No.: 17/626,786

(22) PCT Filed: Oct. 21, 2020

(86) PCT No.: PCT/CN2020/122601
§ 371 (c)(1),
(2) Date: Jan. 12, 2022

(87) PCT Pub. No.: WO2021/129087
PCT Pub. Date: Jul. 1, 2021

(65) Prior Publication Data
US 2022/0254089 A1    Aug. 11, 2022

(30) Foreign Application Priority Data

Dec. 27, 2019    (CN) .......................... 201911376430.2

(51) Int. Cl.
*G06T 15/00*    (2011.01)
*G06T 1/20*    (2006.01)
(Continued)

(52) U.S. Cl.
CPC .............. *G06T 15/005* (2013.01); *G06T 1/20* (2013.01); *G06T 15/80* (2013.01); *G06V 10/751* (2022.01)

(58) Field of Classification Search
None
See application file for complete search history.

(56) References Cited

U.S. PATENT DOCUMENTS

2019/0333185 A1    10/2019    Howson et al.

FOREIGN PATENT DOCUMENTS

| CN | 104167015 | 11/2014 |
| CN | 105976421 | 9/2016 |

OTHER PUBLICATIONS

Pellacini, "User-Configurable Automatic Shader Simplification", Jul. 1, 2005, ACM Transactions on Graphics, vol. 24, No. 3, pp. 445-452 (Year: 2005).*

(Continued)

*Primary Examiner* — Kent W Chang
*Assistant Examiner* — Jonathan M Cofino
(74) *Attorney, Agent, or Firm* — Jiwen Chen; Joywin IP Law PLLC

(57) ABSTRACT

A shader auto-simplifying method and system include: obtaining a rendering instruction flow, extracting a target shader from the rendering instruction flow, and creating a simplifying shader differing from the target shader in code only; intercepting a current frame of a rendering instruction with a rendering initiating instruction of the target shader as a particular frame; obtaining time consumed by the simplifying shader by measuring time needed for rendering the particular frame with the simplifying shader; obtaining error(s) of the simplifying shader by measuring a pixel difference value between a rendering frame drawn by the simplifying shader and the particular frame when a render- (Continued)

ing instruction corresponding to the particular frame is executed; and screening an optimal simplifying shader according to the time consumed by the simplifying shader and the error of the simplifying shader.

9 Claims, 1 Drawing Sheet

(51) Int. Cl.
*G06T 15/80* (2011.01)
*G06V 10/75* (2022.01)

(56) References Cited

OTHER PUBLICATIONS

EnhanceTuition, "Pareto optimality", Oct. 3, 2017, YouTube, 'https://www.youtube.com/watch?v=cT3DcuZnsGs' (Year: 2017).*

* cited by examiner

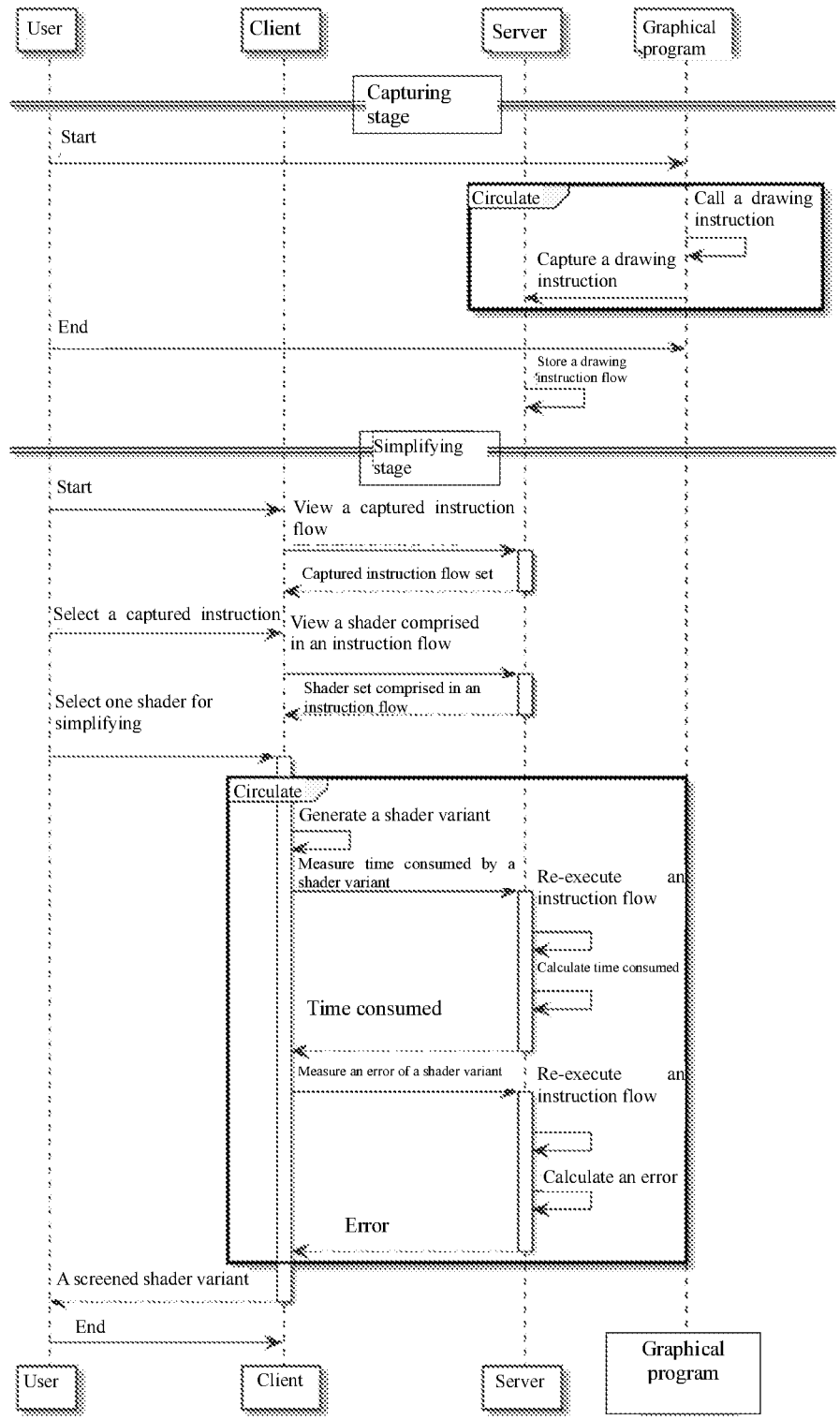

SHADER AUTO-SIMPLIFYING METHOD AND SYSTEM BASED ON RENDERING INSTRUCTION FLOW

This is a U.S. national stage application of PCT Application No. PCT/CN2020/122601 under 35 U.S.C. 371, filed Oct. 21, 2020 in Chinese, claiming priority to Chinese Patent Applications No. 201911376430.2, filed Dec. 27, 2019, all of which are hereby incorporated by reference.

FIELD OF TECHNOLOGY

The present invention relates to the technical field of graphic rendering, code simplifying and auto-test, and in particular, relates to a shader auto-simplifying method and system based on a rendering instruction flow.

BACKGROUND TECHNOLOGY

In the field of graphic rendering, increasing a rendering speed is still a great challenge while ensuring screen quality. In a rendering pipeline, how to use a give three-dimensional model and material for rendering is defined by a shader. Specifically, the shader comprises setting of codes and various parameters. Likewise, a shader code needs to be coded by skilled technicians according to different shader models and its complexity degree decides screen quality and rendering speed to a great extent. At present, out of pursuit for high quality screens, the codes of the shader used in game, virtual reality and other applications are increasingly complicated. Therefore, calculating time consumed by the shader is usually the bottleneck of the rendering pipeline. For a mobile device with a relatively limited calculating ability, the burden caused by a complicated shader is much more apparent, which will not only cause a low frame rate thus affecting interaction, but also intensity device heating and increase power consumption. Therefore, the code of the shader is simplified to a certain extent while ensuring screen quality, so as to reduce the calculating amount required by the shader, which is a very significant task.

A conventional shader simplifying generally needs to be finished manually by skilled technicians, with higher requirements on the technical level and experience of skilled technicians. Moreover, due to high complexity of the shader, it needs more time to explore a simplifying space artificially. The time not only includes time required for artificial modification of the code but also includes time required for test of a simplifying shader. Therefore, a shader auto-simplifying technique has a very high commercial value and academic value.

A current shade auto-simplifying method mainly comprises three steps of firstly auto-generating a simplifying shader, then measuring time consumed by the simplifying shader and errors of the simplifying shader and finally screening according to the time consumed by the simplifying shader and the errors of the simplifying shader. Likewise, it is necessary to modify the original graphical program for the measurement of the time consumed by the simplifying shader and the error(s) of the simplifying shader, and functions of replacing a target shader with the simplifying shader and performing test in a same scene can be additionally realized. Therefore, the current method mainly has the following two defects:

Firstly, current game and virtual reality applications are mostly realized with a game engine of a third party. Since a rendering instruction flow in communication with a display card is packaged in a bottom-layer portion of the game engine, a technician using the game engine is not familiar with or cannot get in contact with these bottom layers, thus it is not an easy thing for accurate measurement of the time consumed by the simplifying shader and the error(s) of the simplifying shader. Failed realization of accurate measurement for the simplifying shader means failure of screening an optimal shader variant at last, and failure of achieving a stable simplifying effect.

In addition, due to dependence on the original graphical program, the current method needs to repeat realization of the measurement of the time consumed by the shader and the error(s) of the shader for different graphical programs and widely applying it to different graphical programs means a large amount of repeated work. Furthermore, due to failure to obtain an original graphical program code, the current method is not applicable. Therefore, the current method is not very practical.

Therefore, a shader auto-simplifying method capable of accurately measuring time consumed by a simplifying shader and error(s) of the simplifying shader without depending on an original graphical program can achieve favorable simplifying effects, such that it is highly practical.

SUMMARY OF THE INVENTION

The object of the present invention is to provide a shader auto-simplifying method and system based on a rendering instruction flow, and the method being capable of accurately measuring time consumed by a simplifying shader and an error of the simplifying shader without depending on an original graphical program. The present invention can achieve favorable simplifying effects, and it is highly practical.

In order to realize the above object, the technical solution of the present invention is provided as follows:
  a shader auto-simplifying method based on a rendering instruction flow, the method comprising:
  obtaining a rendering instruction flow, extracting a target shader from the rendering instruction flow, and creating a simplifying shader differing from the target shader in code only;
  intercepting a current frame of the rendering instruction comprising a rendering initiating instruction of the target shader as a particular frame;
  obtaining time consumed by the simplifying shader by measuring time needed for rendering the particular frame with the simplifying shader;
  obtaining error(s) of the simplifying shader by measuring a pixel difference value between a rendering frame drawn by the simplifying shader and the particular frame when a rendering instruction corresponding to the particular frame is executed; and
  screening an optimal simplifying shader according to the time consumed by the simplifying shader and the error(s) of the simplifying shader.

A shader auto-simplifying system based on a rendering instruction flow, comprising a client and a service side in mutual communication, wherein
  the service side captures a rendering instruction flow called upon running of a graphical program and stores the rendering instruction flow as a file upon end of the graphical program;
  the client obtains a captured rendering flow instruction set from the service side and selects a shader from the rendering instruction flow set as a target shader, generates a simplifying shader corresponding to the target shader and transmits a request for calculating time consumed by the simplifying shader and error(s) of the simplifying shader to the service side;

the service side calculates time consumed by the simplifying shader and error(s) of the simplifying shader according to the request and feeds a calculating result to the client; and the client screens an optimal simplifying shader according to the calculating result.

Compared with the prior art, the advantageous effects of the present invention at least comprise the following:

The present invention has accurate measurement of time consumed by a simplifying shader and error(s) of the simplifying shader for rendering a particular frame, realizing fast screening of an optimal simplifying shader, improving simplifying effects and the obtained simplifying shader being highly practical.

BRIEF DESCRIPTION OF THE DRAWINGS

To describe the technical solutions in the embodiments of the present invention or in the prior art more clearly, the following briefly describes the accompanying renderings required for describing the embodiments or the prior art. Apparently, the accompanying renderings in the following description show merely some embodiments of the present invention, and a person of ordinary skill in the art may derive other renderings from these accompanying renderings without creative efforts.

FIG. 1 is a flow chart of a shader auto-simplifying method based on a rendering instruction flow

DESCRIPTION OF THE EMBODIMENTS

To make the objectives, technical solutions, and advantages of the present invention more comprehensible, the following describes the present invention in detail with reference to accompanying renderings and embodiments. It should be understood that the specific embodiments described herein are merely used to interpret the present invention, but not to limit the protection scope of the present invention.

As shown in FIG. 1, embodiments provide a shader auto-simplifying method based on a rendering instruction flow, specifically comprising steps S101-S105:

S101 of obtaining a rendering instruction flow, extracting a target shader from the rendering instruction flow, and creating a simplifying shader differing from the target shader in code only.

The user starts and uses a graphical program as usual. In the using process, the graphical program constantly calls a rendering instruction to finish rendering a screen and meanwhile the rendering instruction is captured. After the user ends the graphical program, the captured rendering instruction flow is stored as a file.

After obtaining the rendering instruction flow, the user extracts a target shader from the rendering instruction flow, and creates a simplifying shader differing from the target shader in code only. Specifically, the creating process of the simplifying shader comprises:

simplifying codes of the target shader and generating codes of the simplifying shader;

re-executing an obtained rendering instruction flow; recording all rendering instructions with the target shader as an object; after finishing creating the target shader, creating the simplifying shader according to the codes of the simplifying shader; and with the simplifying shader as the object, executing the recorded rendering instruction with the target shade as the object so as to create the simplifying shader differing from the target shader in codes only.

S102 of intercepting a current frame of the rendering instruction comprising a rendering initiating instruction of the target shader as a particular frame.

In embodiments, the obtaining process of the particular frame comprises:

upon executing the rendering instruction flow, employing an instruction of an exchange buffer area to distinguish an adjacent frame and obtaining a rendering instruction set corresponding to a current frame; and if the rendering instruction set corresponding to the current frame comprises a rendering initiating instruction using the target shader, taking the current frame as a particular frame.

After rendering of the particular frame ends, the time consumed by the simplifying shader and the error of the simplifying shader are measured by repeating a rendering instruction in the rendering instruction set corresponding to the particular frame.

S103 of obtaining time consumed by the simplifying shader by measuring time needed for rendering the particular frame with the simplifying shader.

After determining the particular frame, the time consumed by the simplifying shader can be calculated according to the particular frame. Specifically, the obtaining process of the time consumed by the simplifying shader comprises:

repeating execution of the rendering instruction corresponding to the particular frame; upon execution, replacing the target shader with the simplifying shader and inserting a time query instruction before and after the rendering initiating instruction of the simplifying shader, and obtaining the time consumed by the simplifying shader according to a result of the time query instruction. that is, a time difference measured before and after calculating the rendering initiating instruction of the simplifying shader serves as the time consumed by the simplifying shader.

The manner of calculating the time consumed by the target shader is the same as the manner of calculating the time consumed by the simplifying shader, that is, the obtaining process of the time consumed by the target shader comprises:

repeating execution of the rendering instruction corresponding to the particular frame; upon execution, inserting a time query instruction before and after a rendering initiating instruction of the target shader, and obtaining the time consumed by the simplifying shader according to a result of the time query instruction.

S104 of obtaining error(s) of the simplifying shader by measuring a pixel difference value between a rendering frame drawn by the simplifying shader and the particular frame when the rendering instruction corresponding to the particular frame is executed.

After determining the particular frame, the error of the simplifying shader can be calculated according to the particular frame. Specifically, the obtaining process of the error of the simplifying shader comprises:

repeating execution of the rendering instruction corresponding to the particular frame; upon execution, replacing the target shader with the simplifying shader, and obtaining a rendering frame obtained upon end of execution of the rendering instruction so as to take a pixel difference value between the rendering frame and the particular frame as the error of the simplifying shader.

In the embodiments, the screens of the rendering frame and the particular frame are stored as textures. A difference value image between a texture map corresponding to the rendering frame and a texture map corresponding to the particular frame is calculated as the error of the simplifying shader. Specifically, using a mechanism of a grading and elaborate texture for fast calculation can obtain an average value of the difference value image as the error of the simplifying shader.

S105 of screening an optimal simplifying shader according to the time consumed by the simplifying shader and the error of the simplifying shader.

In embodiments, the screening an optimal simplifying shader according to the time consumed by the simplifying shader and the error of the simplifying shader comprises:
  comparing the time consumed by the simplifying shader with the time consumed by the target shader, thereby obtaining a decreasing ratio of the time consumed by the simplifying shader relative to the time consumed by the target shader; and
  screening an optimal simplifying shader according to principles of Pareto Optimality according to error(s) of the decreasing ratio of the time consumed with the simplifying shader.

The embodiments further provide a shader auto-simplifying system based on a rendering instruction flow, comprising a client and a service side in mutual communication. The process of auto-simplifying a shader with the shader auto-simplifying system is divided into a capturing stage and a simplifying stage:
  wherein the capturing stage comprises:
  starting, by a user, a graphical program;
  wherein the graphical program constantly calls a rendering instruction to finish rendering a screen and meanwhile, a service side of auto-simplifying the shader captures the rendering instruction called by the graphical program; and
  ending, by the user, the graphical program;
  wherein the service side stores the captured instruction flow as a file.

The Simplifying Stage Comprises:
  starting, by the user, a client of auto-simplifying a shader, wherein the client transmits to the service side a request for viewing the captured rendering instruction flow and the service side returns a set of the captured instruction flow to the client;
  selecting, by the user, one captured rendering instruction flow, wherein the client transmits to the service side a request for viewing the shader comprised in the rendering instruction flow and the service side returns a shader set comprised in a selected instruction flow to the client;
  selecting, by the user, a target shader for simplifying, based on which the client generates a plurality of simplifying shaders and transmits a request for measuring the simplifying shader to the service side, and the service side subsequently returns an efficiency and error(s) of the simplifying shader and the client screens a simplifying shader according to the efficiency and the time of the simplifying shader, and returns an optimal simplifying shader to the user; and
  ending, by the user, the client of auto-simplifying the shader.

In the shader auto-simplifying system, calculating time consumed by the simplifying shader and error(s) of the simplifying shader comprises:
  intercepting a current frame of the rendering instruction comprising a rendering initiating instruction of the target shader as a particular frame;
  obtaining time consumed by the simplifying shader by measuring time needed for rendering the particular frame with the simplifying shader;
  obtaining error(s) of the simplifying shader by measuring a pixel difference value between a rendering frame drawn by the simplifying shader and the particular frame when the rendering instruction corresponding to the particular frame is executed.

Screening a simplifying shader according to the calculating result comprises:
  comparing the time consumed by the simplifying shader with the time consumed by the target shader, thereby obtaining a decreasing ratio of the time consumed by the simplifying shader relative to the time consumed by the target shader; and
  screening an optimal simplifying shader according to principles of Pareto Optimality according to error(s) of the decreasing ratio of the time consumed with the simplifying shader.

The shader auto-simplifying method and system provided by the embodiments which are capable of accurately measuring an efficiency and error(s) of a shader variant without depending on an original graphical program can achieve favorable simplifying effects, such that they are highly practical.

In the foregoing specific implementations, technical solutions, and advantageous effects of the present invention are described in detail. It should be understood that the foregoing descriptions are merely preferable implementations of the present invention, but are not intended to limit the present invention. Any modification, supplement and equivalent replacement made with the principle of the present invention shall fall within the protection scope of the present invention.

What is claimed is:

1. A shader auto-simplifying method based on a rendering instruction flow, wherein the method comprises:
  obtaining a rendering instruction flow, extracting a target shader from the rendering instruction flow, and creating a simplifying shader differing from the target shader in code only;
  intercepting a current frame of a rendering instruction comprising a rendering initiating instruction of the target shader as a particular frame;
  obtaining time consumed by the simplifying shader by measuring time needed for rendering the particular frame with the simplifying shader;
  obtaining error(s) of the simplifying shader by measuring a pixel difference value between a rendering frame drawn by the simplifying shader and the particular frame when a rendering instruction corresponding to the particular frame is executed; and
  screening an optimal simplifying shader according to the time consumed by the simplifying shader and the error of the simplifying shader;
  wherein the obtaining process of the particular frame comprises:
  upon executing the rendering instruction flow, employing an instruction of an exchange buffer area to distinguish an adjacent frame and obtaining a rendering instruction set corresponding to a current frame; and if the rendering instruction set corresponding to the current frame comprises a rendering initiating instruction using the target shader, taking the current frame as a particular frame.

2. The shader auto-simplifying method based on a rendering instruction flow as claimed in claim 1, wherein the creating process of a simplifying shader comprises:
simplifying codes of the target shader and generating codes of a simplifying shader;
re-executing an obtained rendering instruction flow; recording all rendering instructions with the target shader as an object; after finishing creating the target shader, creating the simplifying shader according to the code of the simplifying shader; and with the simplifying shader as an object, executing the recorded rendering instruction with the target shader as the object so as to create the simplifying shader differing from the target shader in code only.

3. The shader auto-simplifying method based on a rendering instruction flow as claimed in claim 1, wherein the obtaining process of the time consumed by the simplifying shader comprises:
repeating execution of the rendering instruction corresponding to the particular frame; upon execution, replacing the target shader with the simplifying shader and inserting a time query instruction before and after the rendering initiating instruction of the simplifying shader, and obtaining the time consumed by the simplifying shader according to a result of the time query instruction.

4. The shader auto-simplifying method based on a rendering instruction flow as claimed in claim 1, wherein the obtaining process of the error of the simplifying shader comprises:
repeating execution of the rendering instruction corresponding to the particular frame; upon execution, replacing the target shader with the simplifying shader, and obtaining a rendering frame obtained upon end of execution of the rendering instruction so as to take a pixel difference value between the rendering frame and the particular frame as the error of the simplifying shader.

5. The shader auto-simplifying method based on a rendering instruction flow as claimed in claim 1, wherein the screening an optimal simplifying shader according to the time consumed by the simplifying shader and the error of the simplifying shader comprises:
comparing the time consumed by the simplifying shader with the time consumed by the target shader, thereby obtaining a decreasing ratio of the time consumed by the simplifying shader relative to the time consumed by the target shader; and
screening an optimal simplifying shader according to principles of Pareto Optimality according to error(s) of the decreasing ratio of the time consumed with the simplifying shader.

6. The shader auto-simplifying method based on a rendering instruction flow as claimed in claim 5, wherein the obtaining process of the time consumed by the target shader comprises:
repeating execution of the rendering instruction corresponding to the particular frame; upon execution, inserting a time query instruction before and after a rendering initiating instruction of the target shader, and obtaining the time consumed by the simplifying shader according to a result of the time query instructions.

7. A shader auto-simplifying system based on a rendering instruction flow, comprising a client and a service side in mutual communication, wherein
the service side captures a rendering instruction flow called upon running of a graphical program and stores the rendering instruction flow as a file upon end of the graphical program;
the client obtains a captured rendering flow instruction set from the service side and selects a shader from the rendering instruction flow set as a target shader, generates a simplifying shader corresponding to the target shader and transmits a request for calculating time consumed by the simplifying shader and error(s) of the simplifying shader to the service side;
according to the request for calculating time consumed by the simplifying shader and error(s) of the simplifying shader, the service side obtains time consumed by the simplifying shader by specifically measuring time needed for rendering a particular frame with the simplifying shader, obtains error(s) of the simplifying shader by measuring a pixel difference value between a rendering frame drawn by the simplifying shader and the particular frame when the rendering instruction corresponding to the particular frame is executed, and feeds a calculating result back to the client; and
the client screens an optimal simplifying shader according to the calculating result.

8. The shader auto-simplifying system based on a rendering instruction flow as claimed in claim 7, wherein the calculating time consumed by the simplifying shader and error(s) of the simplifying shader comprises:
intercepting a current frame of the rendering instruction comprising a rendering initiating instruction of the target shader as a particular frame;
obtaining time consumed by the simplifying shader by measuring time needed for rendering the particular frame with the simplifying shader; and
obtaining error(s) of the simplifying shader by measuring a pixel difference value between a rendering frame drawn by the simplifying shader and the particular frame when the rendering instruction corresponding to the particular frame is executed.

9. The shader auto-simplifying system based on a rendering instruction flow as claimed in claim 7, wherein the screening an optimal simplifying shader according to a calculating result comprises:
comparing the time consumed by the simplifying shader with the time consumed by the target shader, thereby obtaining a decreasing ratio of the time consumed by the simplifying shader relative to the time consumed by the target shader; and
screening an optimal simplifying shader according to principles of Pareto Optimality according to error(s) of the decreasing ratio of the time consumed with the simplifying shader.

* * * * *